J. Richards.

Forming Table Leaf Joints.

No. 88,331. Patented Mar. 30, 1869.

Witnesses;

Inventor;
John Richards

United States Patent Office.

JOHN RICHARDS, OF CINCINNATI, ASSIGNOR TO HIMSELF AND J. N. BRITTINGHAM, OF COLUMBUS, OHIO.

Letters Patent No. 88,331, dated March 30, 1869.

IMPROVEMENT IN MACHINE FOR MAKING JOINTS IN TABLE-LEAVES.

*The Schedule referred to in these Letters Patent and making part of the same.*

*To all whom these letters come:*

Be it known that I, JOHN RICHARDS, of Cincinnati, in the county of Hamilton, and State of Ohio, have invented a new and useful Machine for Forming Joints for Table-Leaves, commonly known as rule-joints; and I do hereby declare the following to be a full, clear, and exact description of the same, reference being had to the drawings accompanying and forming part of this specification, in which—

Figure 2:
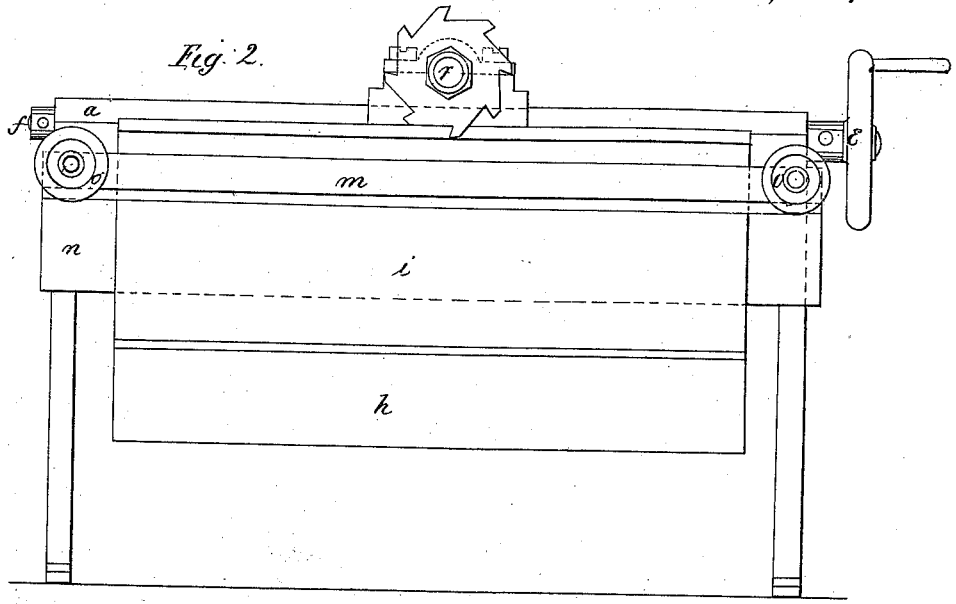
Figure 3:
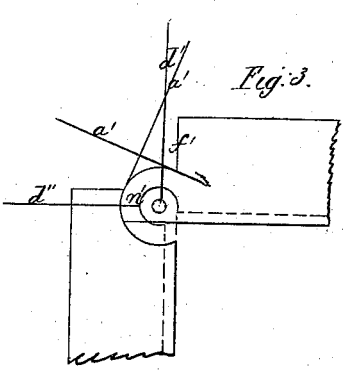
Figure 4:
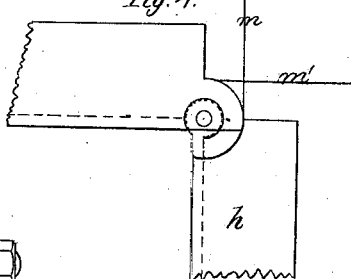
Figure 1:
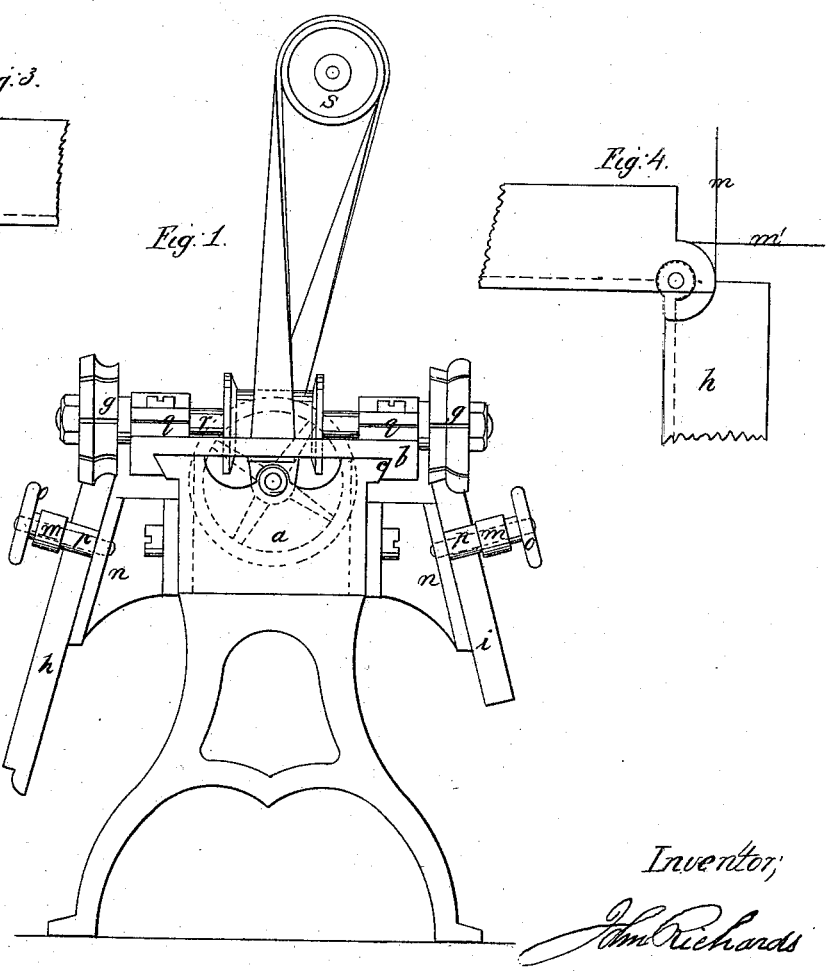

Figure 1 is an end elevation;

Figure 2, a side view of the same;

Figure 3 is a diagram of a joint as moulded by this machine, or made by hand; and Figure 4, a diagram of a joint as heretofore moulded by machinery.

The nature of this invention consists in moulding the joints of table-leaves, commonly called rule-joints, by means of rotary cutter-heads, whose axis is arranged to operate, at an angle with the face of the piece; and in so constructing a machine that a joint can be formed similar to that made by hand-planes, which has not been heretofore attained in machines constructed for this work.

The difference between the hand-made joint and machine-made joint is shown in the diagrams, figs. 3 and 4, fig. 3 being the form of the joint as made by hand-planes, and fig. 4, the machine-made joint.

Attempts to mould these joints have not generally been successful, and but little advantage has heretofore been derived from the use of machinery for the purpose, the popular idea being that it could only be moulded by hand.

To enable others skilled in the art to make and use my invention, I will proceed to describe the mode of constructing and manner of operating the same, referring to the drawings.

A is a frame, upon which is mounted a travelling carriage, $b$, gibbed on at C, and constructed to slide freely upon the top of A, and is moved by means of hand-wheel E, connected with a screw extending the whole length of A, and having a bearing at $f$.

$g\ g$ are cutter-heads, with a profile, to fit the mould required, and are represented as made from solid steel, which is a suitable manner of making them, although they can be made with detached cutters.

$h$ is the bed, or central part of a common table-top, and $i$, a leaf, adapted to the same.

$m\ m$ are clamping-bars, to hold the pieces firmly upon the supports $n\ n$, and are formed slightly convex on their inner face, and spring down, and are held by hand-wheels $o\ o$.

$p\ p$ are gum springs, that serve to raise the clamp-bars $m\ m$, when the wheels $o\ o$ are loosed and the pieces $h$ and $i$ removed.

On the carriage $b$ are mounted the boxes, or spindle-supports $q\ q$ and spindle $r$, as shown. This spindle having cutters at both ends, arranged to work the bed and leaf, as shown, makes one complete joint at each operation.

The spindle $r$ has a position at right angles with the tangential lines $a'\ a'$, shown in the diagram, fig. 3, accomplished in the machine illustrated, by means of the incline supports $n\ n$, by arranging them in this relative position.

The shoulder at $b'$, fig. 3, can be worked beyond the centre line $d'$, fig. 3, and the leaf E' hung proportionately higher at $n'$, so as to cover the hinge shown in red lines, fig. 3.

In fig. 4, the shoulder is worked to the centre line $g'$, the leaf $h'$ being hung barely high enough to cover the hinge, and is the only form of joint that can be moulded with the cutter-shaft at right angles with the lines $m'\ m'$, and without the inclined supports $n\ n$, or their equivalent.

The spindle $r$ is driven by a belt, as shown in red lines in fig. 1, the belt travelling on a drum, S, which has sufficient length to accommodate the movement of carriage $b$.

The manner of operating the machine will be clear enough from the foregoing description.

The pieces $h$ and $i$ are clamped, as shown, and the carriage $b$ moved by hand-wheel E, as will be understood.

Having thus described the nature of my invention, its objects, and the manner of attaining them,

What I regard as new, and desire to secure by Letters Patent, is—

1. The bevelled cutter-heads $g\ g$, in combination with the travelling carriage $b$, arranged to operate in the manner and for the purposes set forth.

2. The combination of the travelling carriage $b$, inclined supports $n$, and spindle $r$, operating as herein specified and for the purposes described.

JNO. RICHARDS.

Witnesses:
 W. S. KELLEY,
 H. W. FORGEY.